United States Patent
Rettenmeier (12)

(10) Patent No.: US 6,420,865 B1
(45) Date of Patent: Jul. 16, 2002

(54) DEVICE FOR DETECTING ROTARY MOVEMENT OF A ROTARY PART BY A SENSOR POSITIONED BY POSITIONING ELEMENTS RELATIVE TO THE ROTARY PART

(75) Inventor: Kai-Uwe Rettenmeier, Beilstein (DE)

(73) Assignee: KACO GmbH & Co., Heilbronn (DE)

( * ) Notice: Subject to any disclaimer, the term of this patent is extended or adjusted under 35 U.S.C. 154(b) by 0 days.

(21) Appl. No.: 09/573,714

(22) Filed: May 12, 2000

(30) Foreign Application Priority Data

May 14, 1999 (DE) .......................................... 199 22 215

(51) Int. Cl.[7] .............................. G01B 7/30; G01P 3/48; F02P 7/067
(52) U.S. Cl. ............. 324/207.25; 324/173; 324/207.22; 123/406.58
(58) Field of Search ................................. 324/160–175, 324/207.13–207.25; 123/146.5 A, 406.58, 612, 613, 617; 73/493, 494, 866.5; 310/68 B; 340/671, 686.1

(56) References Cited

U.S. PATENT DOCUMENTS 3,894,232 A * 7/1975 Laspesa
4,150,653 A * 4/1979 Grancoin ........... 324/207.14 X
4,409,585 A * 10/1983 Rousseau ........... 324/207.22 X
5,243,279 A * 9/1993 Bajat et al. ......... 324/207.25 X
6,025,665 A * 2/2000 Poag et al. ........... 310/68 B X
6,131,547 A * 10/2000 Weber et al. ........... 123/406.58

* cited by examiner

Primary Examiner—Gerard R. Strecker
(74) Attorney, Agent, or Firm—Gudrun E. Huckett (57) ABSTRACT

A device for detecting rotary movement has a rotary part configured to be fixedly connected to a motor shaft and rotate with the motor shaft. One or more sensors are positioned opposite the rotary part and configured to sense rotary movement of the rotary part and transmit signals derived from the rotary movement. A processing unit is connected to the sensor and receives and processes the signals transmitted by the sensor. A receptacle is provided to secure the sensor. The sensor and the receptacle have positioning elements cooperating with one another so as to adjust a position of the sensor relative to the rotary part in a rotational direction of the rotary part. The device cooperates with a mounting device for mounting and positioning the rotary part relative to the sensor.

28 Claims, 6 Drawing Sheets

DEVICE FOR DETECTING ROTARY MOVEMENT OF A ROTARY PART BY A SENSOR POSITIONED BY POSITIONING ELEMENTS RELATIVE TO THE ROTARY PART

BACKGROUND OF THE INVENTION

1. Field of the Invention

The invention relates to a device for detecting rotary movement of a rotary part seated fixedly on a motor shaft, preferably a crankshaft. The device has at least one sensor positioned opposite the rotary part and connected to a detection and/or evaluation unit (processing unit). The sensor is secured in a receptacle. The invention furthermore relates to a mounting device for mounting the rotary part, in particular, for properly positioning the rotary part relative to the sensor in the circumferential direction of the rotary part.

2. Description of the Related Art

It is known to fixedly mount on a crankshaft of an internal combustion engine a transducer wheel as a rotary part. A sensor is positioned opposite the transducer wheel at a circumferential location of the transducer wheel. It detects the rotary movement of the transducer wheel and sends corresponding signals of the rotary movement to the detection and/or evaluation unit (processing unit). By means of the sensor, the rotary position of the transducer wheel and thus the rotary position of the crankshaft can be determined. In this manner it is, for example, possible to detect when the top dead center of the crankshaft, respectively, of the piston of the internal combustion engine connected to the crankshaft is reached. The transducer wheel and the sensor must be mounted precisely relative to one another in order to be able to precisely detect the rotary position of the crankshaft or the position of the piston. This requires a considerable expenditure.

SUMMARY OF THE INVENTION

It is an object of the present invention to embody the device of the aforementioned kind such that the rotary part and the sensor can be mounted in a simple way so as to be precisely aligned relative to one another.

In accordance with the present invention, this is achieved in that the receptacle and the sensor have cooperating positioning elements with which the position of the sensor can be adjusted relative to the rotary part in the rotary direction thereof. This is furthermore achieved in that the rotary part can be mounted with a mounting device and in that the rotary part can be positioned in its circumferential direction relative to the sensor by the mounting device.

In the device according to the invention, the positioning elements of the receptacle and of the sensor cooperate with one another. This makes it possible to fasten the sensor simply and precisely within a short period of time in the receptacle. By means of the positioning elements it is ensured that the sensor can be adjusted precisely in the rotary direction relative to the rotary part so that the sensor can detect reliably the rotary movement of the rotary part. The rotary part can be mounted by means of the mounting device in a simple way but still precisely in regard to its required position.

DESCRIPTION OF THE PREFERRED EMBODIMENTS

With the mounting devices to be disclosed in detail in the following, a transducer wheel (FIGS. 1 through 6) and a sensor are position-precisely mounted relative to one another on a carrier or a rotary shaft seal. The carrier or the rotary shaft seal are mounted on an engine block from which a crankshaft projects. The transducer wheel is fixedly seated on the crankshaft. The sensor detects the signals generated by the transducer wheel and transmits them to a processing unit. The processing unit monitors by means of the transmitted signals the proper function and position of the crankshaft provided with the transducer wheel or the rotary shaft seal.

Figure 2:
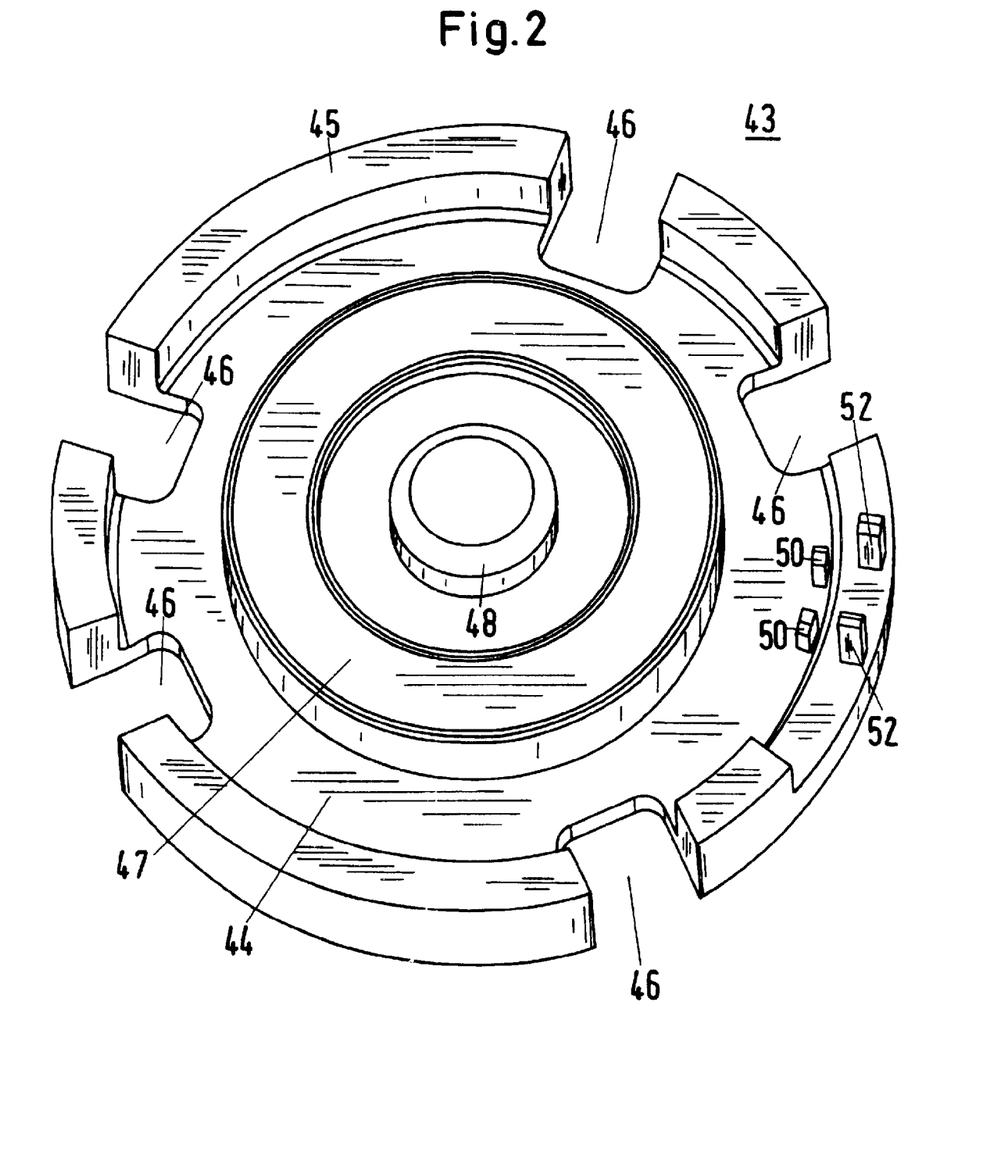
FIG. 2 shows the mounting device in a perspective illustration in a view from below.
Figure 3:
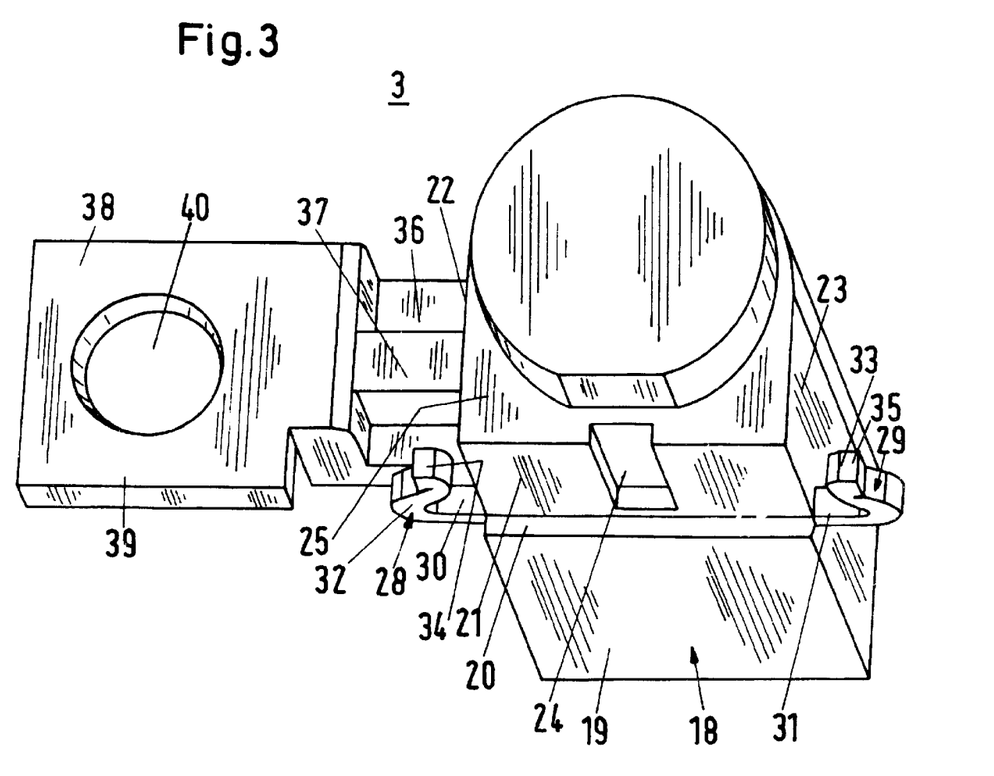
FIG. 3 is a perspective and enlarged illustration of the sensor according to FIG. 1.
Figure 4:
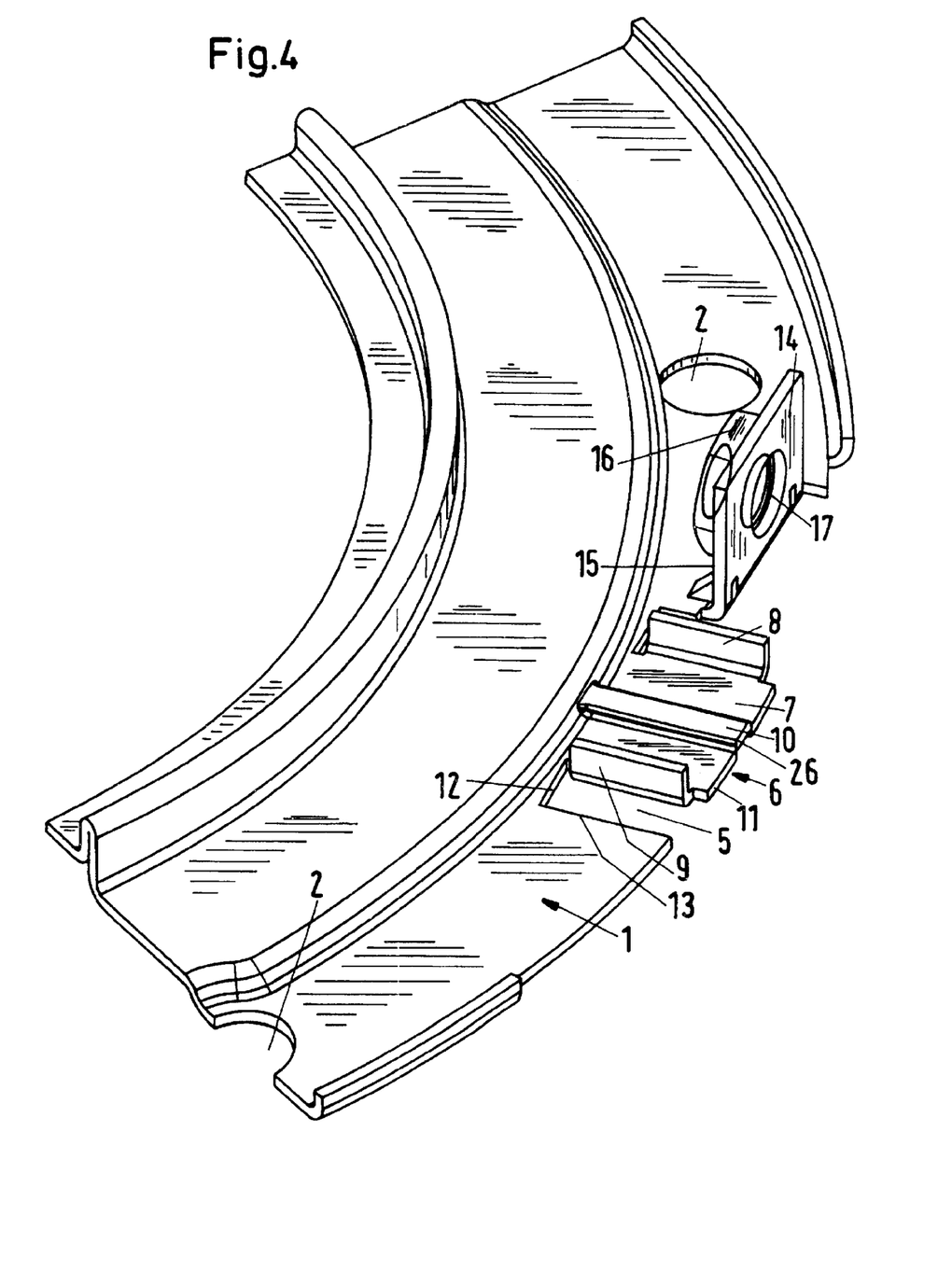
FIG. 4 shows on an enlarged scale the receptacle of the carrier for the sensor.

In the embodiment according to FIGS. 1 through 5, an annular carrier 1 is fastened to an engine block (not shown). For this purpose, the carrier 1 which is, for example, formed as a sheet metal flange, is provided with fastening openings 2 for screws etc. with which the carrier 1 can be mounted on the engine block. A sensor 3 is fastened on the carrier 1 and is mounted opposite the transducer wheel 4. The transducer wheel 4 is fixedly connected to the crankshaft projecting from the engine block and penetrating the carrier 1. On the circumference of the carrier 1, as shown in FIG. 4, a cutout 5 is provided in which a receptacle 6 for the sensor 3 is provided. The receptacle 6 in cross-section is U-shaped and has a stay 7 which extends radially and has at its two longitudinal edges perpendicularly projecting legs 8 and 9. The stay 7 and the legs 8, 9 are advantageously a monolithic part. The stay 7 has at half its width a radially extending projection 10 as a reinforcement which is in the form of a corresponding embossment formed in the stay 7. The legs 8, 9 are spaced with minimal spacing from the end face 11 of the stay 7. Moreover, they have a minimal spacing from the back wall 12 delimiting the cutout 5.

For producing the receptacle 6, the carrier 1 is stamped within its circumferential area. Subsequently, the legs 8, 9 are bent upwardly out of the plane of the carrier 1. In this way, the receptacle 6 can be manufactured simply and inexpensively. The leg 9 is positioned at a spacing from the neighboring side wall 13 of the cutout 5.

The oppositely positioned leg 8 is spaced from a counter bracket 14 which is bent substantially at a right angle out of the plane of the carrier 1 at a rim portion thereof . The counter bracket 14 has a rectangular contour and is positioned approximately perpendicularly to the legs 8, 9 of the receptacle 6. The counter bracket 14 has a backside 15 which is facing the center of the annular carrier 1, and at this backside 15 a nut 16 is fastened which is positioned coaxially to an opening 17 penetrating the counter bracket 14. The counter bracket 14 is radially recessed relative to the end face 11 of the stay 7 of the receptacle 6.

The annular carrier 1 is otherwise matched with respect to its cross-sectional design to the engine block to which it is to be fastened.

The sensor 3 must have a precisely defined position relative to the transducer wheel 4. The precise mounting position of the sensor 3 is realized by the receptacle 6 and the counter bracket 14 on the carrier 1. As shown in FIG. 3, the sensor 3 has a parallelepipedal sensor housing 18 whose underside 19 is planar. The underside 19 has a step 20 extending over its length and adjacent thereto a planar support surface 21. The support surface 21 extends between the two oppositely arranged parallel sidewalls 22 and 23 of the sensor housing 18. The sensor housing 18 rests in the mounted position by means of its support surface 21 areally (with a large contact area) against the stay 7 of the receptacle 6 on the carrier 1. The spacing between the two parallel sidewalls 22, 23 of the sensor housing 18 corresponds to the spacing between the two legs 8, 9 of the receptacle 6. Accordingly, the sensor housing 18 rests in the mounted position areally (with a large contact area) against the facing inner sides of the legs 8, 9 of the sensor receptacle 6.

A recess 24, rectangular in cross-section, is centrally arranged in the support surface 21. The projection 10 on the stay 7 of the receptacle 6 engages the recess 24 in the mounted position of the sensor 3. The width of the recess 24 corresponds approximately to the width of the projection 10. The recess 24 is open at the backside 25 of the sensor housing 18 and ends in the opposite direction with minimal spacing relative to the step 20. The radial mounting position of the sensor 3 is reached when the sensor housing 18 has been pushed to such an extent onto the stay 7 of the receptacle 6 that a connecting bracket 38 of the sensor 3 (FIG. 3) contacts the counter bracket 14.

At the level of the step 20 centering springs 28, 29 project from the sidewalls 22, 23. They are of identical design and arranged mirror-symmetrically to one another. The two centering springs 28, 29 have a connecting portion 30, 31 extending perpendicularly away from the sidewalls 22, 23. The connecting portions 30, 31 have a transition portion into a hook part 32, 33. The hook parts 32, 33 are oriented in a direction toward the sidewalls 22, 23 of the sensor housing 18. The free ends 34, 35 of the hook parts 32, 33 are bent in opposite directions to one another so that they face away from the sidewalls 22, 23. The two centering springs 28, 29 are positioned in a common plane that is located perpendicularly to the sidewalls 22, 23 of the sensor housing 18 and extends advantageously parallel to the underside 19 of the sensor housing 18. The free ends 34, 35 of the hook parts 32, 33 are positioned at a spacing from the sidewalls 22, 23 of the sensor housing 18.

By means of the centering springs 28, 29, the sensor 3 is centered relative. to the receptacle 6. The sensor 3 is pushed in the manner disclosed supra onto the stay 7 of the receptacle 6, and the projection 10 of the stay 7 engages the recess 24 in the support surface 21 of the sensor housing 18. The centering springs 28, 29 rest with elastic tension against the outer sides of the legs 8, 9 of the receptacle 6 which face away from one another. Since the free ends 34, 35 of the hook parts 32, 33 are oriented away from the sidewalls 22, 23 of the sensor housing 18, the centering springs 28, 29 can be easily pushed onto the legs 8, 9 of the receptacle 6. Because of the elastic tension, the sensor 3 is precisely radially aligned relative to the carrier 1.

The bracket-like connecting part 36 projects perpendicularly from the side wall 22 of the sensor housing 18 and, as shown in FIG. 3, is stiffened at its backside by it least one rib 37. The connecting part 36 connects the sensor housing 18 with the connecting bracket 38 which has a planar backside 39 resting areally (with a large contact area) against the counter bracket 14. The connecting bracket 38 has an opening 40 penetrating it which is aligned with the opening 17 of the counter bracket 14 in the mounted position of the sensor 3. A fastener in the form of a threaded bolt 41 (FIG. 1) is pushed through the two openings 40, 17 and threaded into the nut 16 at the backside of the counter bracket 14. In this way, the sensor 3 is fixedly connected to the carrier 1. The centering springs 28, 29 ensure a perfect circumferential alignment of the sensor 3 relative to the transducer wheel 4. By means of the contacting brackets 14, 38, the sensor 3 can be reliably fastened on the carrier 1 in the aligned position. By means of the threaded bolt 41 the sensor 3 can also be easily removed or exchanged. The sensor receptacle 6 and the counter bracket 14, which, as disclosed supra, are advantageously monolithic components of the annular carrier 1, can be precisely positioned already during the manufacture of the carrier 1 so that the sensor 3, in turn, can be precisely positioned by simply slipping it into the receptacle 6 and fastening it on the carrier 1 by means of the threaded bolt 41.

The transducer wheel 4 is provided at its circumference with teeth 42 extending parallel to the axis of the crankshaft. The transducer wheel 4 must be mounted in a precise position relative to the sensor 3. In order to ensure this, a mounting device 43 is provided (FIGS. 1 and 2) with which such a precise positioning is possible.

Figure 5:
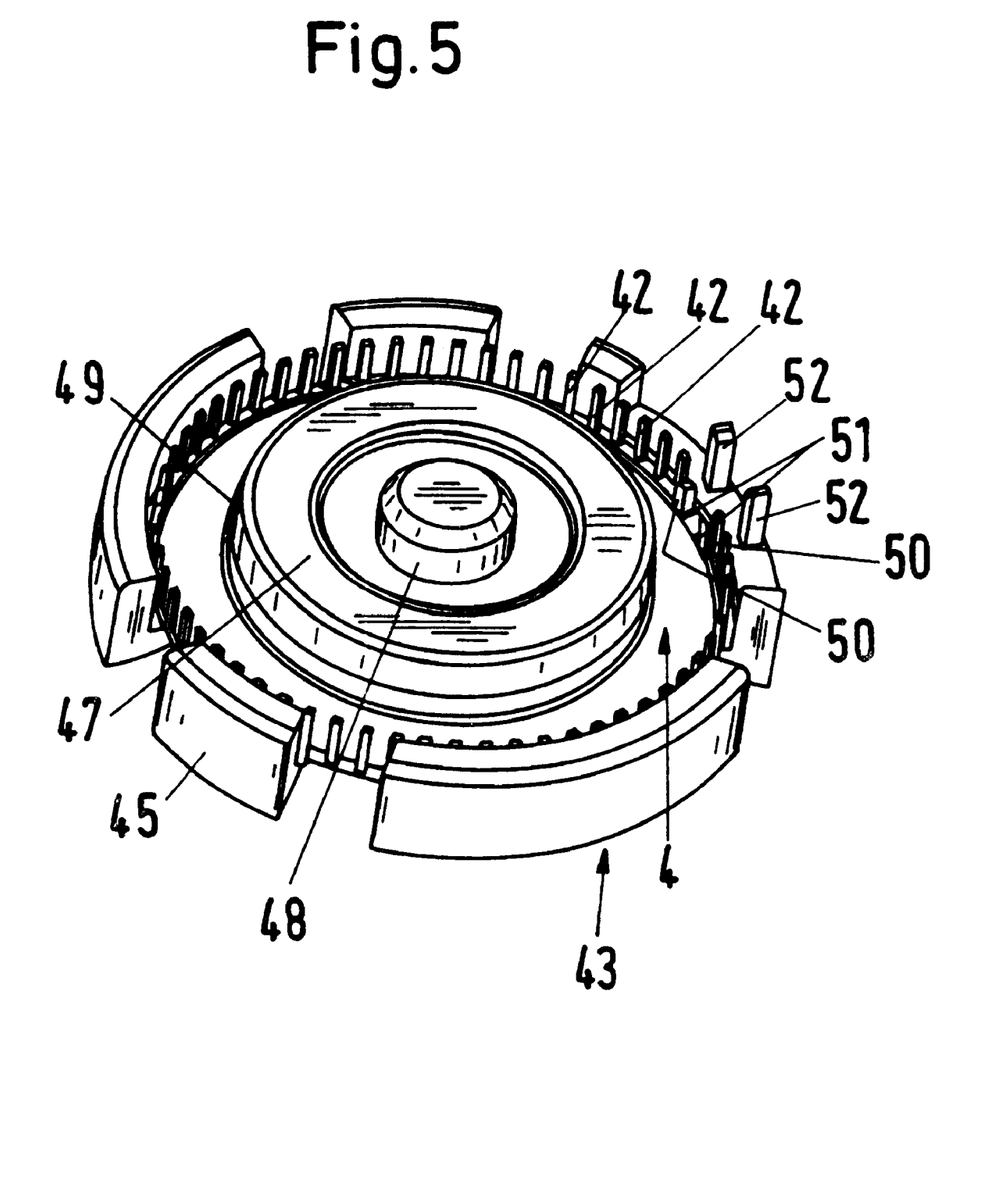
FIG. 5 is a perspective illustration in a view from below of the mounting device with mounted transducer wheel.

The mounting device 43 has an annular base member 44 whose outer rim 45 is thicker than the remaining portion of the base member 44. The rim 45 extends in the direction toward the carrier 1 in the mounting position. The rim 45 is provided with cutouts 46 which are distributed about its circumference and extend into the base member 44. A ring 47 projects from the underside of the disc-shaped base member 44. The ring 47 and the underside face the carrier 1 in the mounted position. The axis of the ring 47 coincides with the axis of the base member 44. The ring 47 is radially inwardly spaced from the thick rim 45 and surrounds with radial spacing a central ring 48 which projects in the same direction from the base member 44 as the ring 47. The axis of the ring 48 also coincides with the axis of the base member 44. The ring 47 has the task of centering the transducer wheel 4 during mounting. As illustrated in FIG. 5, the annular transducer wheel 4 rests with its radially inner rim 49 against the outer mantle of the ring 47. The transducer wheel 4 itself rests against the bottom of the base member 44.

In order to bring the transducer wheel 4 into a defined position relative to the mounting device 43, two first positioning members or noses 50 project perpendicularly from the base member 44 directly adjacent to the rim 45. They are circumferentially spaced from one another and engage two openings 51 of the transducer wheel 4 (FIG. 5). The row of transducer teeth 42 is interrupted in the area between the two first positioning members or noses 50. These first positioning members or noses 50 ensure in a simple way that the transducer wheel 4 is in a precisely defined position with respect to the mounting device 43 for mounting on the crankshaft.

For mounting, the transducer wheel 4 is first inserted into the mounting device 43 such that the first positioning noses 50 engage in the disclosed manner the openings 51 of the transducer wheel 4. The transducer wheel 4 is inserted such that the teeth 42 of the transducer wheel 4 extend in the same direction as the thick rim 45 of the mounting device 43. The teeth 42 do not project past the rim 45 but are advantageously slightly axially recessed relative to the rim 45.

Figure 1:
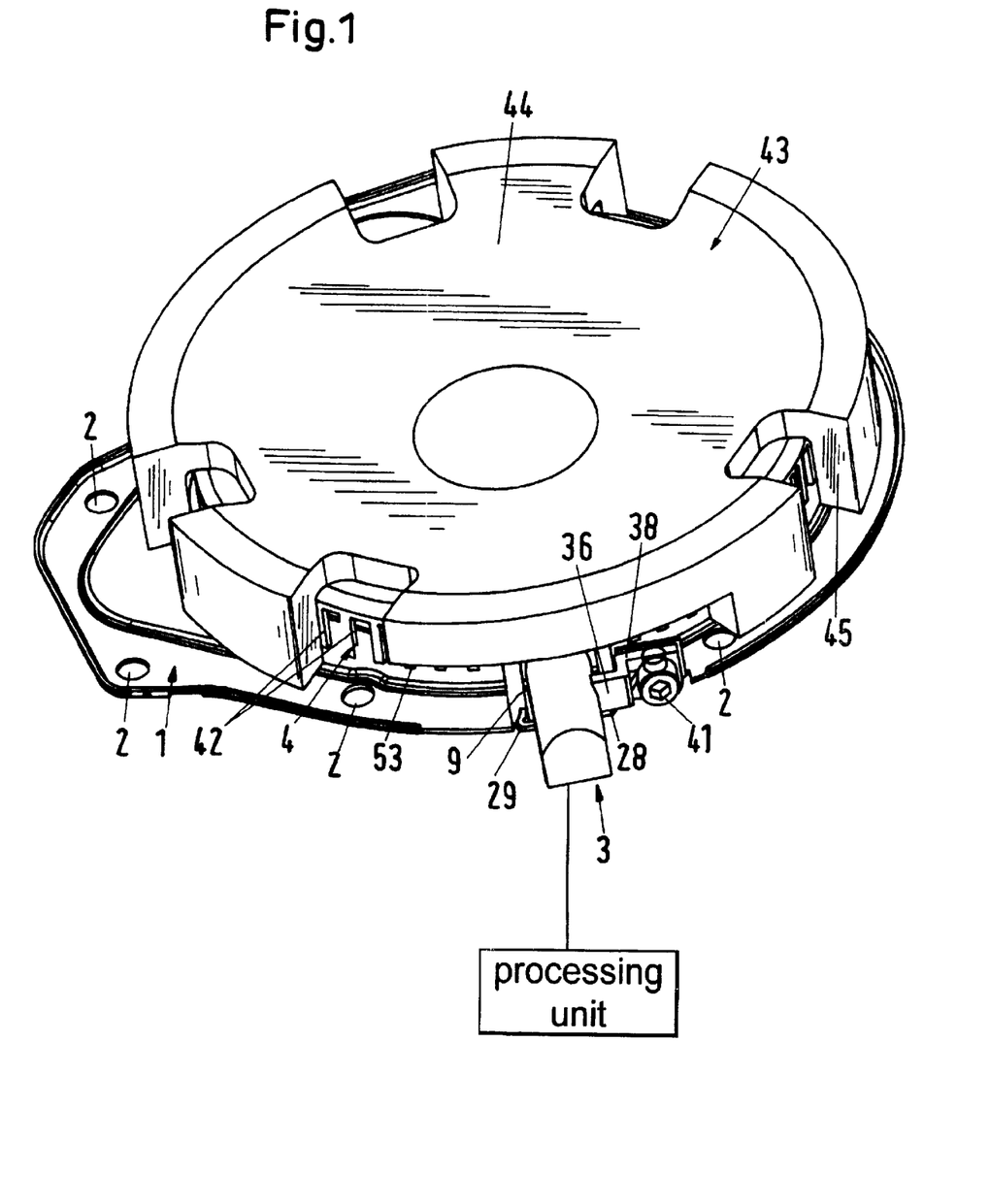
FIG. 1 is a perspective illustration of the device according to the invention together with a mounting device, by which the transducer wheel and the sensor are mounted position-precisely relative to one another on a carrier.

The mounting device 43 with the mounted transducer wheel 4 is placed onto the carrier 1 (FIG. 1). In order to achieve a precise alignment of the transducer wheel 4 positioned in the mounting device 43 relative to the sensor 3, the mounting device 43 is provided with two second positioning or centering members 52 (FIG. 5) that are positioned circumferentially spaced relative to one another. They project axially from the rim 45 of the mounting device 43. Their spacing is selected such that they rest in the mounted position against the outer sides of the legs 8, 9 of the receptacle 6 facing away from one another. The mounting device 43 is placed onto the carrier 1 such that the two second positioning (centering) members 52 embrace the legs 8, 9 of the sensor receptacle 6.

The rim 45 of the mounting device 43 in the area of the centering members (noses) 52 is shorter than in the remaining area (FIGS. 1 and 2). Accordingly, a depression 53 is formed which has such a length in a circumferential direction of the mounting device 43 that the sensor receptacle 6 and the counter bracket 14 are located within this depression 53 in the mounted position. In the mounted position according to FIG. 1, the thick rim 45 of the mounting device 43 rests against the carrier 1 in the vicinity of the circumferential area.

By means of the second centering members 52 a precise radial positioning of the mounting device 43 and the transducer wheel 4 received therein is realized. When subsequently the sensor 3 is pushed into the sensor receptacle 6 in the manner disclosed above and fastened to the counter bracket 14, the sensor 3 and the transducer wheel 4 have a precisely defined position relative to one another. After screwing the sensor 3 to the carrier 1, the mounting device 43 is axially removed. The transducer wheel 4 is seated fixedly on the crankshaft. The central ring 48 of the mounting device 43 ensures an axial pre-centering relative to the crankshaft In the described manner, by means of the mounting device 43 the relative position of the transducer wheel 4 and of the sensor 3 to one another can be adjusted precisely, without requiring complex adjusting steps. Due to the disclosed configuration of the mounting device 43 and of the carrier 1, the two parts (3, 4) can be easily positioned in a precise location relative to one another. During the mounting process the mounting device 43 will automatically be pushed off because the crankshaft presses onto the ring 47 of the mounting device 43.

The centering noses 52 are positioned radially at the level of the positioning noses 50. When the mounting device 43 together with the transducer wheel 4 is connected to the carrier 1 and the sensor 3 is pushed into the receptacle 6, the sensor 3 is positioned between the two centering noses 52, when viewed in the radial direction. The tooth gap of the transducer wheel 4 is then positioned accordingly also opposite the sensor 3. In the represented embodiment, the tooth gap of the transducer wheel 4 is positioned opposite the sensor 3 when the crankshaft moves through its top dead center. Accordingly, the rpm of the crankshaft can be easily monitored during operation of the engine.

The first positioning noses 50 are advantageously configured such that the transducer wheel 4 is seated with slight tension in the mounting device 43. The second positioning members (centering noses) 52 can also be configured such that they rest with tension against the. legs 8, 9 of the sensor receptacle 6. This ensures a simple and precise positioning.

Figure 6:
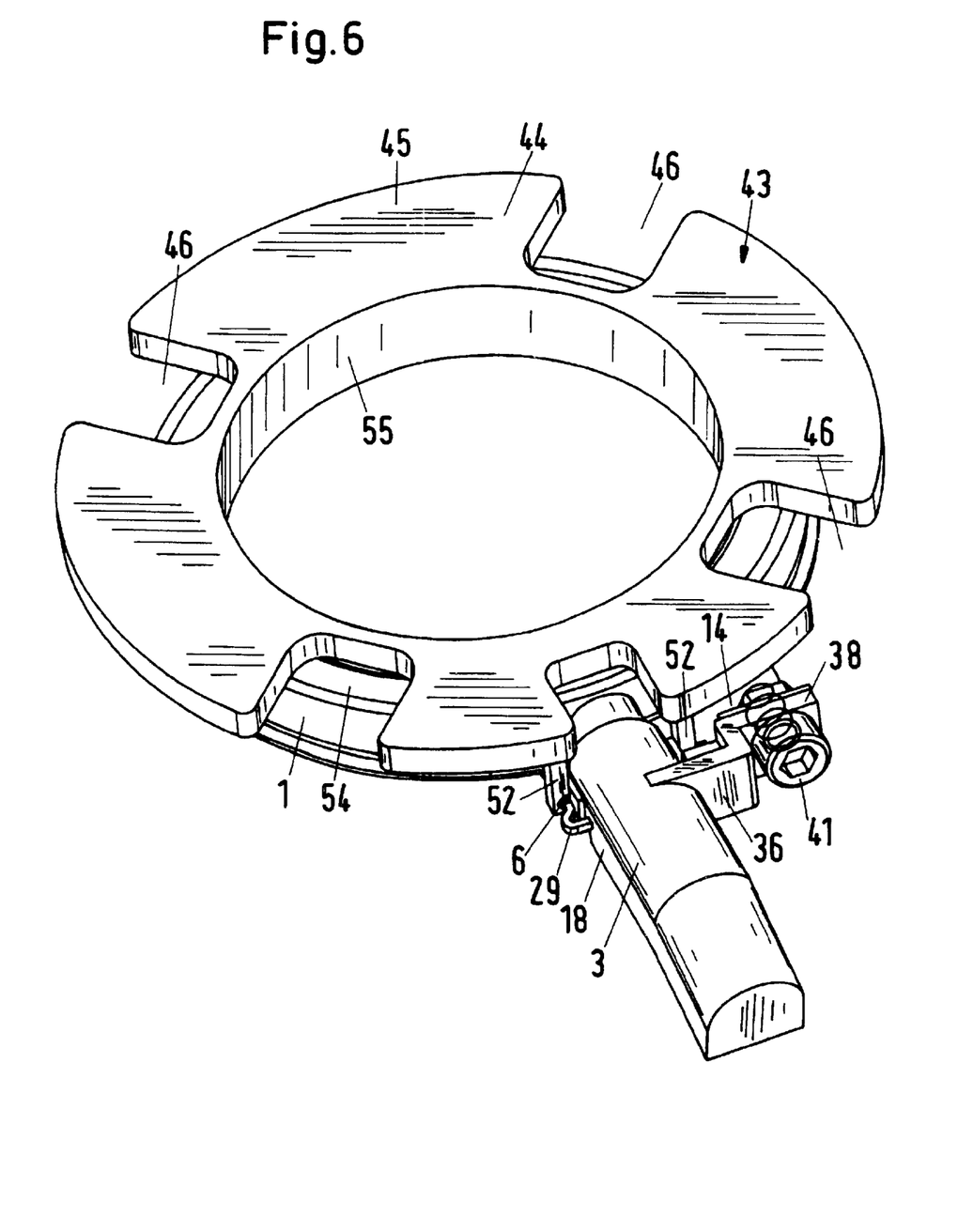
FIG. 6 is a perspective illustration of a second embodiment of the device according to the invention together with a mounting device.

FIG. 6 shows an embodiment in which, instead of a plate-like sheet metal carrier 1 a sheet metal carrier is used which has radial symmetry. It is formed by a radially projecting flange of a radial shaft seal (not shown) which is pressed into a bore of the engine block. The sensor receptacle 6 is machined into the flange and is of the same configuration as in the previously disclosed embodiment. The radial shaft seal, as is known in the art, has a support on which the radially projecting flange is provided. External to the sealing area the radial shaft seal is provided with a penetration at the level of the sensor 3 so that signals derived from the transducer wheel 54 can be detected. In the circumferential area, the transducer wheel 54 is provided with embedded magnets (not shown) arranged in a row in the circumferential direction and cooperating with the sensor 3. The transducer wheel 54 is mounted with the aid of the mounting device 43. It is essentially of identical design as disclosed in the previous embodiment. It has an annular base member 44 which is provided with recesses 46 distributed about its circumference. In contrast to the afore described embodiment, the outer rim 45 is not thicker. The radially inner rim 55 of the base member 44 is configured as a flange and extends in the mounted position in the direction toward the annular carrier 1. It is fastened at a corresponding engine block in a suitable manner and comprises the sensor receptacle 6 and the counter bracket 14 for attachment of the sensor 3 with its connecting bracket 38. The, sensor housing 18 is provided with the two centering springs, only the centering spring 29 being visible in FIG. 6. The fastening of the sensor 3 and its positioning are realized in the same manner as in the preceding disclosed embodiment.

The transducer wheel 54 is pushed into the mounting device 43 which, in analogy to the preceding embodiment, is configured as a mounting mandrel. The position fixation of the transducerwheel 54 is realized by the upwardly projecting rim 55 against which the transducer wheel 54 rests with its inner circumference. In accordance with the, previous embodiment, first the transducer wheel 54 is precisely inserted and positioned in the mounting device 43. The mounting device 43 is subsequently introduced into the carrier, and the centering noses 52 embrace the outer sides of the legs 8, 9 of the sensor receptacle 6 (FIG. 4). Subsequently, the sensor 3 is inserted into the receptacle 6, and the centering springs 28, 29 come to rest against the outer sides of the legs 8, 9 of the sensor receptacle 6 which face away from one another. The sensor 3 is then fastened in the mounted positioned with the threaded bolt 41 on the counter bracket 14 of the carrier 1. In this embodiment, the mounting device 43 is also automatically removed (by the crankshaft) during the mounting process.

In a further embodiment (not illustrated) the sensor housing 18 is not provided with centering springs 28, 29. The positioning is realized in this case by means of the sidewalls 22, 23 of the sensor housing 18 which rest against the facing inner sides of the legs 8, 9 of the sensor receptacle 6 and ensure the positioning of the sensor 3 in cooperation with these legs. In this case it is advantageous when the spacing of the sidewalls 22, 23 is slightly smaller than the spacing of the legs 8, 9 of the sensor receptacle 6. The sidewalls 22, 23 and the legs 8, 9 of the sensor receptacle 6 form a clearance fit. The smaller this clearance fit (play), the higher the positioning precision. Fastening of such a sensor is carried out in the manner described supra by the connecting bracket 38 which is fastened by means of the threaded bolt 41 to the counter bracket 14 of the carrier 1. The sensor housing 18 can be used in the embodiments illustrated in FIGS. 1 through 6.

While specific embodiments of the invention have been shown and described in detail to illustrate the inventive principles, it will be understood that the invention may be embodied otherwise without departing from such principles.

What is claimed is:

1. A device for detecting rotary movement comprising:
   a rotary part (4, 54) configured to be fixedly connected to a motor shaft and rotate with the motor shaft;
   at least one sensor (3) positioned radially opposite said rotary part (4, 54) and configured to sense rotary movement of said rotary part and transmit signals derived from the rotary movement;
   a processing unit connected to said at least one sensor (3) and configured to receive and process said signals transmitted by said at least one sensor (3)
   a receptacle (6) configured to receive said at least sensor (3);
   said at least one sensor (3) and said receptacle (6) having positioning elements (8, 9; 22, 23; 28, 29) configured to cooperate with one another so as to adjust a position of said at least one sensor (3) relative to said rotary part (4; 54) in a rotational direction of said rotary part (4; 54);
   wherein said receptacle (6) has at least one of said positioning elements (8, 9) and wherein said at least one positioning element (8, 9) extends substantially radially relative to said rotary part (4, 54);
   wherein said receptacle (6) is U-shaped and has two legs (8, 9), wherein said at least one positioning element (8, 9) of said receptacle (6) is one of said two legs (8, 9), wherein said receptacle (6) has a stay (7) connecting said two legs (8, 9), said stay (7) forming a support for said at least one sensor (3);
   wherein said at least one sensor (3) has a sensor housing (18) having an underside (21) resting on said stay (7);
   wherein said stay (7) has at least one profiling (10) extending radially relative to said rotary part(4, 54) and wherein said underside (21) has at least one profiling (24) matching said at least one profiling of said stay (7); and
   wherein said at least one profiling (10) of said stay (7) is a projection and wherein said at least profiling of said underside (21) is a recess (24).

2. The device according to claim 1, wherein said sensor housing (18) has two sidewalls, wherein said at least one sensor (3) has at least one of said positioning elements (22, 23), and wherein said at least one positioning element (22, 23) of said at least one sensor (3) is formed by at least one of said two sidewalls (22) of said sensor housing (18).

3. The device according to claim 2, wherein said two sidewalls form said positioning elements (22, 23) of said sensor (3).

4. The device according to claim 3, wherein said two legs of said U-shaped receptacle (6) form said positioning elements of said receptacle (6) and wherein said two sidewalls (22, 23) and said two legs (8, 9) form a clearance fit.

5. The device according to claim 1, wherein said at least one sensor (3) has at least one of said positioning elements (28, 29) and wherein said at least one positioning element (28, 29) is at least one centering spring (28, 29) configured to center said at least one sensor (3) relative to said receptacle (6).

6. The device according to claim 5, wherein said sensor (3) has a sensor housing (18) and said at least one centering spring (28, 29) is connected to said sensor housing (18) and projects from said, sensor housing (18).

7. The device according to claim 6, wherein two of said centering springs (28, 29) are connected to opposite sidewalls (22, 23) of said sensor housing (18), wherein said receptacle (6) has two of said positioning elements (8, 9), and wherein said two centering springs (28, 29) rest against said two positioning elements of said receptacle (6) with elastic tension.

8. The device according to claim 7, wherein said centering springs (28, 29) rest against outer sides of said positioning elements (8, 9) of said receptacle (6) facing away from one another.

9. A device for detecting rotary movement comprising:
   a rotary part (4, 54) configured to be fixedly connected to a motor shaft and rotate with the motor shaft;
   at least one sensor (3) positioned opposite said rotary part (4, 54) and configured to sense rotary movement of said rotary part and transmit signals derived from the rotary movement;
   a processing unit connected to said at least one sensor (3) and configured to receive and process said signals transmitted by said at least one sensor (3)
   a receptacle (6) configured to receive said at least one sensor (3);
   a carrier (1), wherein said receptacle (6) is connected to said carrier (1);
   said at least one sensor (3) and said receptacle (6) having positioning elements (8, 9; 22, 23; 28, 29) configured to cooperate with one another so as to adjust a position of said at least one sensor (3) relative to said rotary part (4;54) in a rotational direction of said rotary part (4; 54);
   wherein said at least one sensor (3) has at least one fastening element (38) configured to be connected to a counter bracket (14) provided on said carrier (1).

10. The device according to claim 9, wherein said carrier (1) is annular.

11. The device according to claim 9, wherein said carrier (1) is of sheet metal and wherein said receptacle (6) is formed by stamping said carrier (1).

12. The device according to claim 9, wherein said fastening element (38) is a bracket.

13. The device according to claim 9, wherein said counter bracket (14) is provided on a rim portion of said carrier (1) and is a bent part of said rim portion positioned perpendicularly to said receptacle (6).

14. The device according to claim 13, wherein said counter bracket (14) has an opening (17) configured to receive a fastener (41), wherein said counter bracket (14) comprises at least one securing element (16) configured to secure said fastener (41), wherein said fastening element (38) has an opening (40) and said fastener (41) penetrates said opening (40).

15. An arrangement of:
   a device for detecting rotary movement, comprising a rotary part (4, 54) configured to be fixedly connected to a motor shaft and rotate with the motor shaft; at least one sensor (3) positioned opposite said rotary part (4, 54) and configured to sense rotary movement of said rotary part and transmit signals derived from the rotary movement; a processing unit connected to said at least one sensor (3) and configured to receive and process said signals transmitted by said at least one sensor (3); a receptacle (6) configured to receive said at least one sensor (3); said at least one sensor (3) and said receptacle (6) having positioning elements (8, 9; 22, 23; 28, 29) configured to cooperate with one another so as to adjust a position of said at least one sensor (3) relative to said rotary part (4; 54) in a rotational direction of said rotary part (4; 54); and a mounting device (43) configured to mount said rotary part (4, 54);

wherein said mounting device (43) has at least one first positioning member (50) and said rotary part (4, 54) has at least one counter element (51) engaging said at least one first positioning member (50), wherein said at least one first positioning member (50) is configured to position said rotary part (4, 54) in a precisely defined position relative to said mounting device (43) for mounting said rotary part (4, 54) on the motor shaft.

16. The arrangement according to claim 15, wherein said mounting device (43), is formed as a mounting mandrel.

17. The arrangement according to claim 15, wherein said mounting device (43) has two of said first positioning members (50) arranged spaced from one another in a circumferential direction of said mounting device (43).

18. The arrangement according to claim 15, wherein said mounting device (43) has a circular contour and wherein said at least one first positioning member (50) is located near a circumference of said mounting device (43).

19. The arrangement according to claim 15, wherein said at least one first positioning member (50) extends axially relative to said mounting device (43) and is a positioning nose.

20. The arrangement according to claim 15, wherein said at least one counter element (51) is at least one opening (51) of said rotary part (4, 54).

21. The arrangement according to claim 15, wherein said mounting device (43) has a base member (44) configured to support said rotary part (4, 54).

22. The arrangement according to claim 15, wherein said mounting device (43) is configured to position said rotary part (4, 54) relative to said at least one sensor (3) in a circumferential direction of said rotary part (4, 54).

23. The arrangement according to claim 22, wherein said mounting device (43) has at least one second positioning member (52) configured to cooperate with said receptacle (6).

24. The arrangement according to claim 23, wherein said mounting device (43) has two of said second positioning members (52) arranged spaced from one another in a circumferential direction of said mounting device (43).

25. The arrangement according to claim 24, wherein said two second positioning members (52) cooperate with said positioning elements (8, 9) provided on said, receptacle (6).

26. The arrangement according to claim 25, wherein said two second positioning members (52) rest against said positioning elements (8, 9) of said receptacle (6) with tension.

27. The arrangement according to claim 23, wherein said first and second positioning members (50, 52) are located on a same side of said mounting device (43) and are positioning noses.

28. The arrangement according to claim 15, wherein said rotary part (4, 54) is a transducer wheel.

* * * * *